(No Model.) 2 Sheets—Sheet 2.

G. S. AGEE.
CORN PLANTER.

No. 339,124. Patented Apr. 6, 1886.

WITNESSES: Chas. Nida, C. Sedgwick

INVENTOR: G. S. Agee
BY Munn & Co.
ATTORNEYS.

UNITED STATES PATENT OFFICE.

GEORGE SPARREL AGEE, OF LOUISVILLE, KANSAS.

CORN-PLANTER.

SPECIFICATION forming part of Letters Patent No. 339,124, dated April 6, 1886.

Application filed July 11, 1885. Serial No. 171,399. (No model.)

*To all whom it may concern:*

Be it known that I, GEORGE SPARREL AGEE, of Louisville, in the county of Pottawatomie and State of Kansas, have invented a new and useful Improvement in Corn-Planters, of which the following is a full, clear, and exact description.

Reference is to be had to the accompanying drawings, forming part of this specification, in which similar letters of reference indicate corresponding parts in all the figures.

Figure 1:
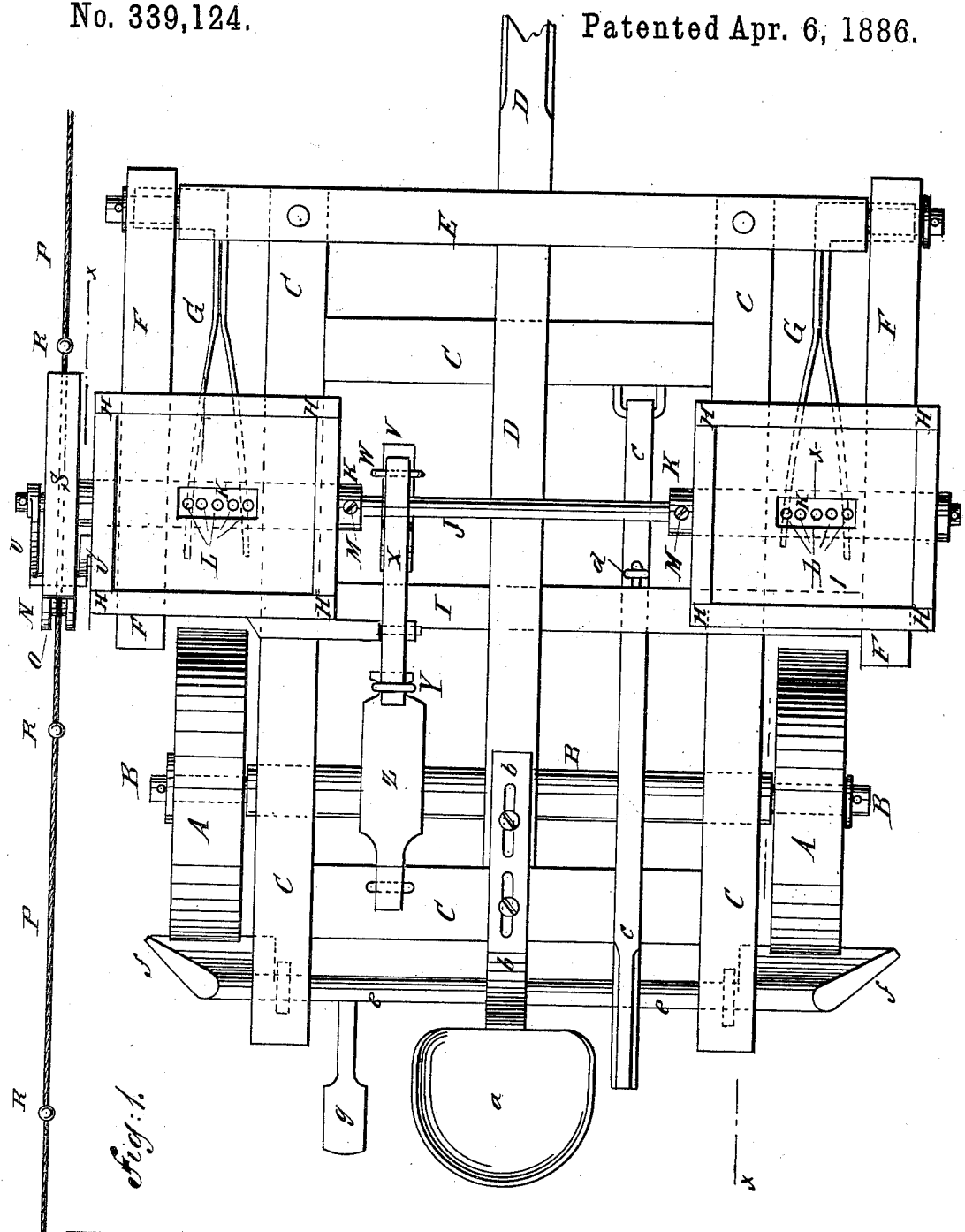
Figure 2:
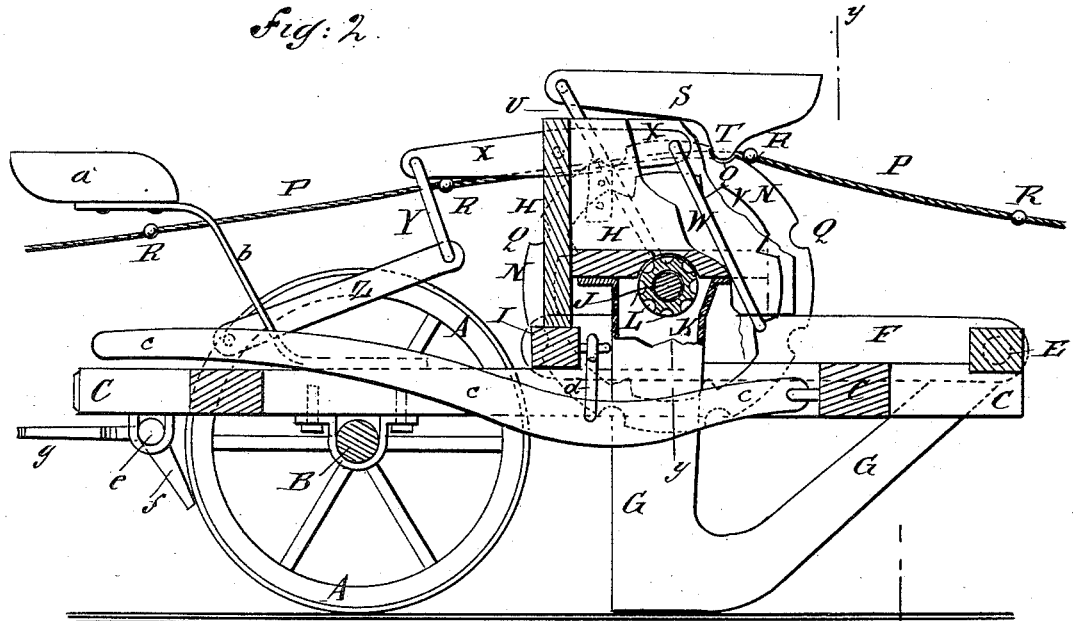
Figure 3:
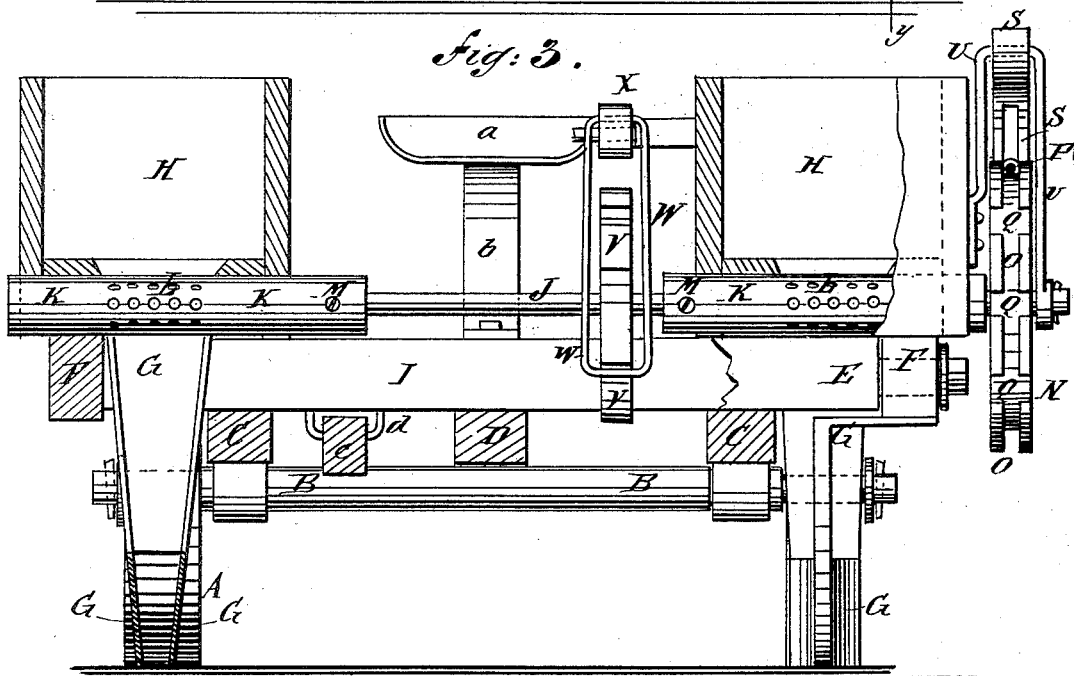

Figure 1 is a plan view of one of my improved corn-planters. Fig. 2 is a sectional side elevation of the same, taken through the broken line $x\,x\,x$, Fig. 1. Fig. 3 is a sectional front elevation of the same, taken through the broken line $y\,y\,y$, Fig. 2.

The object of this invention is to provide corn-planters simple in construction, strong and durable in use, and reliable in operation.

The invention consists in the construction and combination of various parts of the cornplanter, as will be hereinafter fully described, and then pointed out in the claims.

A represents the wheels, the axle B of which may revolve in bearings attached to the frame C, or may be rigidly connected with the said frame.

To the middle part of the frame C is attached the tongue D, to which and to the forward end of the side bars of the said frame C is attached a cross-bar, E.

To the ends of the cross-bar E are pivoted the forward ends of the top bars, F, of the runners G. The rear bars of the runners G are made hollow to serve as spouts to conduct the seed to the ground, and are attached at their upper ends to the bottoms of the seed-boxes H. The seed-boxes H are connected by a crossbar, I, attached to them, or to the rear ends of the bars F, or to both.

J is a shaft, which revolves in bearings attached to the seed-boxes H or to the bars F, and upon which beneath openings in the bottoms of the said seed-boxes are placed cylinders K. The cylinders K have each eight (more or less) rows of holes, L, each row containing five (more or less) holes, and each hole being of such a size as to contain a single kernel of corn, so that as the cylinders K are revolved the holes L will receive corn from the seed-boxes H and will drop it to the ground. The cylinders K are secured in place upon the shaft J by set-screws M, so that by loosening the said set-screws M the cylinders K can be adjusted to leave any desired number of holes L beneath the openings in the hopper-bottoms, and thus regulate the amount of seed planted, as may be desired.

To the end of the shaft J is attached a wheel, N, in the face of which are formed an annular groove, O, to receive the check-wire P, and recesses Q, at equal distances apart and equal in number to the number of rows of holes L in the cylinders K, to receive the knots or balls R of the said check-wire P, so that the seed-dropping cylinders K will be revolved through the space of one row of holes by the passage of each ball R over the wheel N. The wheel N is stopped at the proper point by a latch, S, the face of which is grooved for the passage of the check-wire P, and has a projection, T, formed upon it to drop into each recess Q, and thus stop the said wheel. The rear end of the latch S is hinged to a support, U, attached to the seed-box H and shaft J, the arms of which pass down upon the opposite sides of the wheel N to prevent the wire from becoming accidentally displaced.

To the middle part of the shaft J is attached a ratchet-wheel, V, having its teeth equally distant, and having as many teeth as there are rows of holes L in the cylinders K. With the teeth of the ratchet-wheel V engages a link-pawl, W, which is hinged to and suspended from the forward end of a lever, X, pivoted to an arm attached to the seed-box H or other suitable support. The rear end of the lever X is connected by a link, Y, with the forward end of a foot-lever or treadle, Z, pivoted to the rear part of the frame C in such a position that it can be readily reached and operated by the driver from his seat $a$.

The seed-dropping mechanism can be operated by hand-power, if desired.

The driver's seat $a$ is attached to the upper end of the standard $b$, the lower end of which is attached to the rear part of the frame C or tongue D, and is slotted to receive the fastening-bolts, so that the said seat can be readily moved forward or back to cause the weight of the driver to properly balance the machine.

To the forward cross-bar of the frame C is pivoted the forward end of a lever, c, which is connected by a link, d, or other suitable means with the cross-bar I, so that the said cross-bar, and with it the seed-boxes H and the runners G, can be readily raised from the ground when desired. The rear end of the lever c extends back into such a position that it can be readily reached and operated by the driver from his seat a.

In bearings attached to the rear ends of the side bars of the frame C rocks a shaft, e, to the ends of which are attached or upon them are formed scrapers f, in such positions as to scrape off any soil that may adhere to the rims of the wheels A.

To the rock-shaft e is attached a foot-lever, g, in such a position that it can be readily reached and operated by the driver with his foot to turn the shaft e and swing the scrapers f against the rims of the wheels A when required.

Having thus described my invention, what I claim as new, and desire to secure by Letters Patent, is—

1. The combination, with a seed-box having an oblong opening in its bottom, of a revoluble shaft held from longitudinal movement below the said opening, and a laterally-adjustable cylinder on the shaft and provided with series of rows of cavities of approximately uniform size, the width of the opening in the seed-box bottom being the same as that of the series of cavities in the cylinder, whereby one or more rows of the said cavities may register with the said opening, substantially as set forth.

2. The combination, with the dropper-shaft and the laterally-adjustable seed-dropping cylinder having a series of rows of cavities, of the check-wheel having a peripheral groove and transverse notches corresponding in number with the rows of said cavities, substantially as set forth.

3. The combination, with the dropper-shaft J, of the peripherally-grooved and transversely-notched check-wheel N, and the pivoted latch S, having a projection, T, substantially as and for the purpose set forth.

4. The combination, with the frame, the shaft J, the seed-dropping cylinders thereon, and the peripherally and transversely grooved check-wheel N, of the notched wheel V, the pivoted lever X, the link W, connecting the lever and notched wheel, the foot-lever Z, extended near the driver's seat, and the link Y, connecting said foot-lever and the rear end of lever X, substantially as set forth.

5. The combination, with the dropper-shaft J and the grooved check-wheel N thereon, of the U-shaped support U, extending on opposite sides of said check-wheel and secured at one end to the frame-work and at the other to the dropper-shaft outside of the check-wheel, and the latch S, pivoted on the support U at the bend thereof, substantially as set forth.

6. The combination of the frame C, the rock-shaft e, journaled at the front end thereof, the runners G, secured thereto, the top runner-bars, F, the cross-bar I, connecting the rear ends of the bars F, the seed-boxes H, mounted on said runner-bars, the shaft J, the laterally-adjustable seed-cylinders thereon, the lever c, connected to the front cross-bar of the frame C, extended back to the driver's seat, and a link, d, connecting the lever and cross-bars I of the runners, substantially as set forth.

GEORGE SPARREL AGEE.

Witnesses:
C. E. TUCKER,
J. C. LAIRD.